United States Patent
Tanaka

(10) Patent No.: US 7,741,389 B2
(45) Date of Patent: Jun. 22, 2010

(54) RESIN COMPOSITION AND MOLDED ARTICLE

(75) Inventor: Yuichiro Tanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/172,458

(22) Filed: Jul. 14, 2008

(65) Prior Publication Data

US 2009/0043018 A1 Feb. 12, 2009

(30) Foreign Application Priority Data

Aug. 6, 2007 (JP) ............... 2007-204704

(51) Int. Cl.
 *C08K 5/34* (2006.01)
 *B22C 1/22* (2006.01)
 *C08G 63/68* (2006.01)
(52) U.S. Cl. .................. 524/90; 523/148; 528/293
(58) Field of Classification Search .................. 524/90; 523/148; 528/293
See application file for complete search history.

(56) References Cited

U.S. PATENT DOCUMENTS

| 2,551,731 A * | 5/1951 | Gordon et al. ............... 528/293 |
| 2005/0014870 A1 | 1/2005 | Sato et al. |
| 2006/0167134 A1 * | 7/2006 | Sato et al. ................... 523/148 |

FOREIGN PATENT DOCUMENTS

| WO | 2004/022649 A1 | 3/2004 |
| WO | 2007/052847 A1 | 5/2007 |

* cited by examiner

*Primary Examiner*—Timothy J. Kugel
*Assistant Examiner*—Atnaf Admasu
(74) *Attorney, Agent, or Firm*—Fitzpatrick, Cella, Harper & Scinto

(57) ABSTRACT

A resin composition with a high crystallization rate that contains a polyalkylene furan dicarboxylate resin and a porphyrin compound, and a molded article composed of the resin composition. The polyalkylene furan dicarboxylate resin is preferably a polybutylene furan dicarboxylate resin. The porphyrin compound is preferably hematoporphyrin dihydrochloride. The molded article is obtained by molding the resin composition.

3 Claims, 3 Drawing Sheets

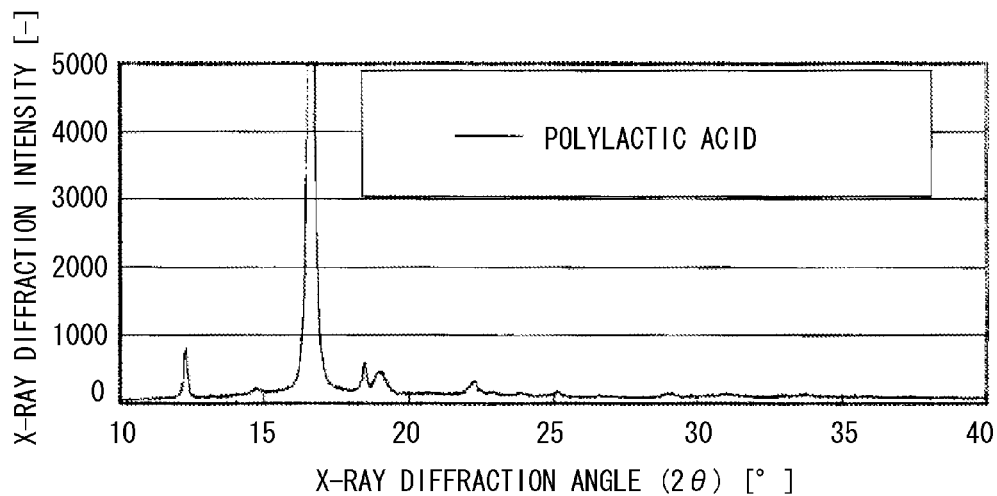
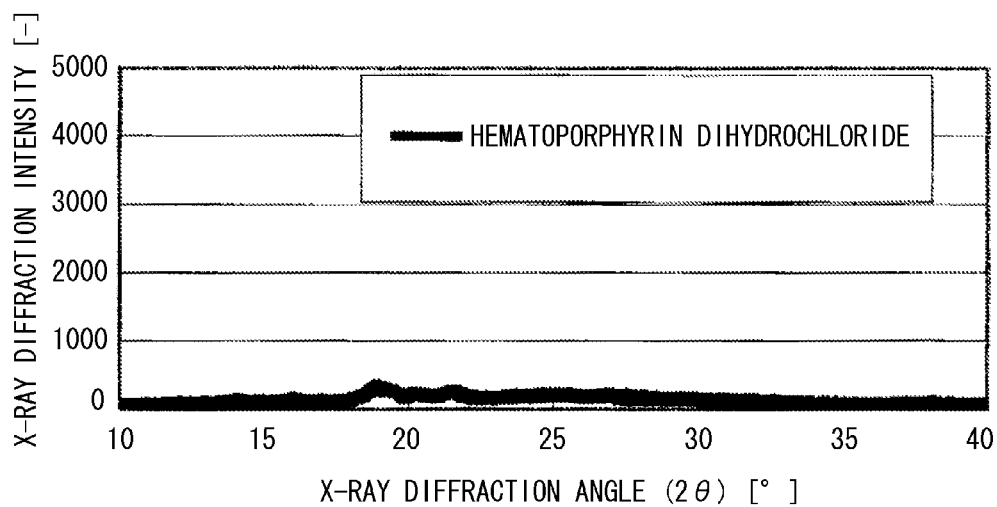

RESIN COMPOSITION AND MOLDED ARTICLE

BACKGROUND OF THE INVENTION

1. Field of the Invention

The present invention relates to a resin composition and a molded article, and more particularly, to a plant-derived resin composition with a high crystallization rate and a molded article obtained using the resin composition.

2. Description of the Related Art

Studies of resins synthesized from plant-derived starting materials, rather than from petroleum, have been widely conducted in recent years to alleviate the environmental problems, such as global warming and depletion of petroleum resources. In particular, polylactic acid has been studied as a plant-derived resin, and a variety of products made from this resin have been found to be of practical use.

Thermoplastic resins made from polylactic acid can be generally classified as amorphous resins and crystalline resins, and the latter can be crystallized by a thermal treatment. In the case of crystalline resins, because crystallization can improve heat resistance and mechanical properties, such as rigidity and impact resistance, the resins are preferably used after crystallization rather than in an amorphous state. However, when injection molding is performed, the resin has to be held in a mold for a certain period of time at an adjusted temperature after the injection to ensure complete crystallization. Therefore, the crystallization rate has to be increased in order to increase productivity.

The addition of a crystal nucleating agent is known as a method for increasing the crystallization rate, and certain specific cyclic compounds have been reported to be effective as crystal nucleating agents for polylactic acid (International Publication No. WO2004/022649).

However, the crystallization rate of plant-derived resin compositions is still insufficient compared with that of the conventional petroleum-derived resin compositions for general use, and a further increase in crystallization rate is required.

SUMMARY OF THE INVENTION

The present invention provides a resin composition with a high crystallization rate that comprises a polyalkylene furan dicarboxylate resin and a porphyrin compound.

The polyalkylene furan dicarboxylate resin is preferably a polybutylene furan dicarboxylate resin. The porphyrin compound is preferably hematoporphyrin dihydrochloride.

The present invention also provides a molded article obtained by molding the aforementioned resin composition.

Because the resin composition in accordance with the present invention has a high crystallization rate, injection molding thereof can be conducted at a high productivity.

BRIEF DESCRIPTION OF THE DRAWINGS

FIG. 2A is an XRD (X-ray diffraction) spectrum of polylactic acid in Comparative Example 11;

FIG. 2B is an XRD (X-ray diffraction) spectrum of hematoporphyrin dihydrochloride in Comparative Example 11;

DESCRIPTION OF THE EMBODIMENTS

The present invention provides a non-petroleum originating, plant-derived resin composition, which has a superior crystallization rate to the prior art resins of this type. In particular, the resin composition comprises a polyalkylene furan dicarboxylate resin and a porphyrin compound.

The polyalkylene furan dicarboxylate resin in accordance with the present invention is obtained by polymerization of a dicarboxylic acid having a furan ring in its molecule or an ester forming derivative thereof and a diol or an ester forming derivative thereof as the main components.

The alkyl group in the polyalkylene furan dicarboxylate may be linear or branched. The preferred compounds are polybutylene furan dicarboxylate, polypropylene furan dicarboxylate, and polyethylene furan dicarboxylate. Polybutylene furan dicarboxylate is particularly preferred.

The increase in the crystallization rate of a resin is controlled by two components: crystal nuclei formation rate and crystal growth rate. Comprehensive research conducted by the inventors demonstrated that crystal nucleating agents produce a significant effect on the crystal nuclei formation rate. Further, it was found that the crystal nuclei formation rate is determined by the compatibility of the crystal nucleating agent with the resin, rather than by the independent structure of the agent.

This compatibility has been ascertained as a factor indicating high epitaxiality of the resin and the crystal nucleating agent, that is, the similarity of their crystal systems. A crystal system is most often determined by a structural portion with a high bulk in a molecule and the arrangement of functional groups. The polyalkylene furan dicarboxylate in accordance with the present invention has a furan ring in its molecule, and this ring appears to make a large contribution to the crystal structure. Accordingly, compounds with a regularly arranged chemical structure that are similar to a furan ring should be suitable as crystal nucleating agents.

Figure 1A:
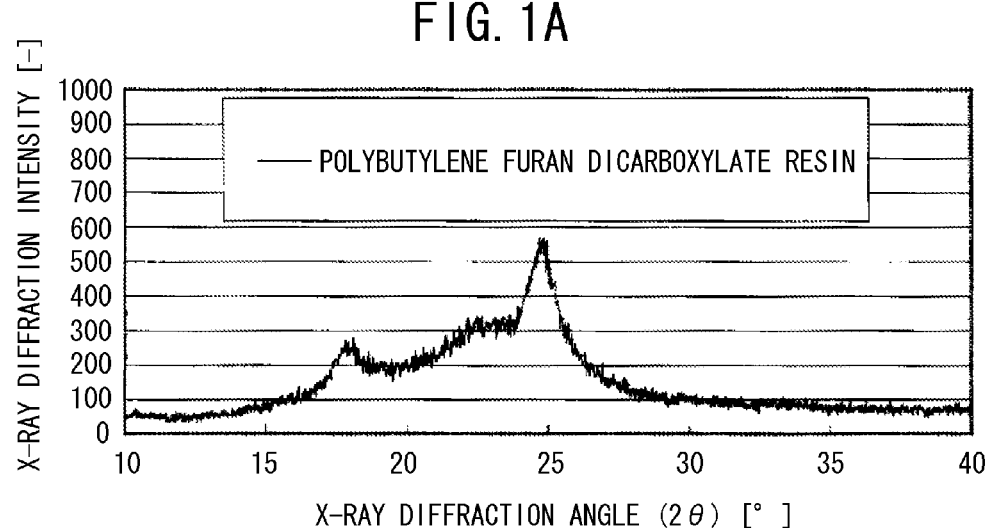
FIG. 1A is an XRD (X-ray diffraction) spectrum of polybutylene furan dicarboxylate in Example 3.
Figure 1B:
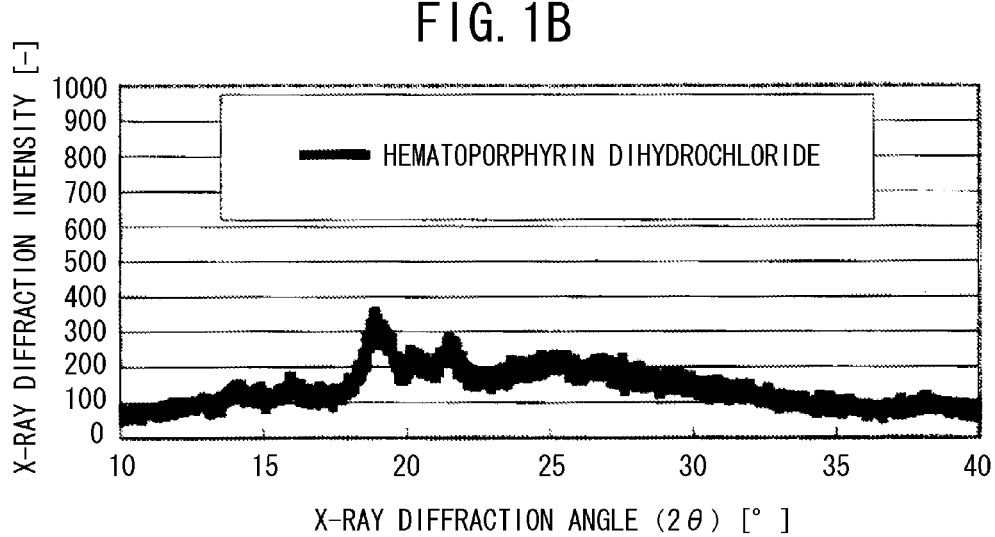
FIG. 1B is an XRD (X-ray diffraction) spectrum of hematoporphyrin dihydrochloride in Example 3.

The results of the research based on this determination demonstrated that polyalkylene furan dicarboxylates and porphyrin compounds have similar crystal structures, as show by an X-ray diffraction (XRD) spectrum in FIGS. 1A and 1B.

FIGS. 2A and 2B show X-ray diffraction (XRD) spectra of polylactic acid and hematoporphyrin dihydrochloride. These figures demonstrate that neither the peak positions nor the peak intensities of the X-ray spectra of polylactic acid resin and porphyrin compound match. This result indicates that the crystal structures of the two are not similar and this combination can hardly be considered suitable for increasing the crystallization rate.

The porphyrin compound used in accordance with the present invention is a compound having a structure in which four pyrrole groups and methine groups are alternately bonded. Examples of suitable porphyrin compounds include porphyrin, chlorine, phlorin, porphodimethine, porphomethine, bacteriochlorin, isobacteriochlorin, porphyrinogen, and phorbin.

Other examples of suitable porphyrin compounds include derivatives obtained by attaching a functional group to porphyrin. Examples of suitable derivatives of a porphyrin compound include phytoporphyrin, cytoporphyrin, uroporphyrin, coproporphyrin, hematoporphyrin, mesoporphyrin, protoporphyrin, rhodoporphyrin, phyloporphyrin, etioporphyrin, pyroporphyrin, and deuteroporphyrin.

Other examples of suitable porphyrin compounds include derivatives obtained by attaching a functional group to chlorine. Examples of suitable derivatives of chlorine compounds include phytochlorin, rhodochlorin, phylochlorin, and pyrochlorin.

Metal complexes that can be formed using the aforementioned porphyrin compounds as ligands can also be used. The metal complexes can be obtained by coordinating on metal elements of groups 1 to 15 of the periodic table, with the exception of Be and rare earth elements.

Metal complexes that can be formed using the above-described porphyrin derivatives, and chlorine derivatives as ligands can be also used. Examples of such complexes include chlorophyll, which is a magnesium complex of a porphyrin derivative, cyanocobalamin, which is a cobalt complex of a porphyrin derivative, and hemoglobin, which is an iron complex of a porphyrin derivative.

The preferable porphyrin compound in accordance with the present invention is hematoporphyrin dihydrochloride.

A method for adding a porphyrin compound to a polyalkylene furan dicarboxylate resin is described below. A mixture of polyalkylene furan dicarboxylate resin pellets and a porphyrin compound powder obtained by mixing the two components in advance at a predetermined weight ratio is loaded in a twin-screw kneader with a temperature adjusted to a melting point of the resin or to a higher temperature, and kneading is performed for a predetermined time. The aggregated particles of the porphyrin compound are pulverized by the shear stress created by the screws of the kneader and uniformly dispersed in the resin.

In a preferred embodiment, the present invention provides a resin composition obtained by kneading a mixture of polybutylene furan dicarboxylate resin as a polyalkylene furan dicarboxylate resin and hematoporphyrin dihydrochloride as a porphyrin compound with a kneader at a screw revolution speed of 150 rpm and a kneading temperature of 180° C.

The amount of the porphyrin compound added to the resin is from 0.1 to 50 parts by weight, preferably from 0.1 to 5 parts by weight, based on a total of 100 parts by weight of the polyalkylene furan dicarboxylate resin and porphyrin compound. When the amount of the porphyrin compound is less than 0.1 part by weight, the effect of increasing the crystallization rate is reduced, and when the amount of the porphyrin compound exceeds 50 parts by weight, the amount of the resin is undesirably decreased, creating a risk of losing the mechanical properties of the resin. The aforementioned porphyrin compounds may be used individually or in various combinations.

The resin composition in accordance with the present invention can be pelletized with a pelletizer.

A method for manufacturing a molded article in accordance with the present invention can be implemented by molding the resin composition using, for example, an injection molding apparatus.

EXAMPLES

The present invention is described below in greater detail with reference to specific examples. However, the present invention is not limited to these examples.

The following method was used for evaluating the crystallization rate.

The resin composition was placed on an aluminum plate and heated for 15 min at 200° C. in a muffle furnace. A molten sample was taken from the muffle furnace and immediately rapidly cooled by being immersed for 3 minutes in water at a temperature of 25° C. to produce an amorphous sample.

The amorphous sample was subjected to annealing for a predetermined period of time at 110° C. in a drier, and a plurality of samples with different degrees of crystallization were produced.

A relative degree of crystallization of the obtained samples was evaluated at a temperature increase rate of 20° C./min in a differential scanning calorimeter (DSC). The relative degree of crystallization that was affected by the annealing treatment reached saturation and did not increase after annealing for a predetermined period of time. The relative value was evaluated by using the melting energy in this saturated crystal state as a reference.

A method for calculating the relative degree of crystallization is described below. The crystallization energy calculated from the area of an exothermic peak representing crystallization in the temperature increase process was denoted by $\Delta Hc$ [J/g], and the crystal melting energy calculated from the area of an endothermic peak observed in crystal melting was denoted by $\Delta Hm$ [J/g]. Also, the crystal melting energy for a sample in which the crystallization was saturated was taken as 35 [J/g]. A relative degree of crystallization [%] of the crystal saturation sample was obtained by performing the calculation by using the following formula: "Relative Degree of Crystallization [%]"=$((\Delta Hm-\Delta Hc)/35)\times 100$.

Example 1

A mixture obtained by mixing 99 parts by weight of polybutylene furan dicarboxylate resin and 1 part by weight of hematoporphyrin dihydrochloride was loaded in a Labo Plastomill Mixer (trade name, blade: roller type, product of Toyo Seiki Seisakusho KK). A resin composition was obtained by melting and kneading at a temperature of 180° C. and a rotation speed of 30 rpm while rotating the two screws in the opposite directions.

Example 2

The resin composition obtained in Example 1 was placed on an aluminum plate and heated for 15 min at 200° C. in a muffle furnace. A molten sample was taken from the muffle furnace and immediately rapidly cooled by being immersed for 3 minutes in water at a temperature of 25° C. to produce an amorphous sample.

Example 3

Several amorphous samples obtained in accordance with Example 2 were annealed at a temperature of 110° C. in a drier. The annealing time was 30, 45, 90, 120 or 150 seconds. The annealed samples were removed from the drier to obtain samples with different degrees of crystallization.

FIG. 1A and FIG. 1B show XRD (X-ray diffraction) spectra of different compositions in Example 3. FIG. 1A shows the spectrum of the polybutylene furan dicarboxylate. FIG. 1B shows the spectrum of hematoporphyrin dihydrochloride. The spectra shown in FIG. 1A and FIG. 1B have peaks in the vicinity of X-ray diffraction angles of 18° and 25°, and the X-ray diffraction intensities in both cases were several hundreds in magnitude. Therefore, these spectra demonstrate that polybutylene furan dicarboxylate and hematoporphyrin dihydrochloride have similar crystal structures.

Example 4

Figure 3:
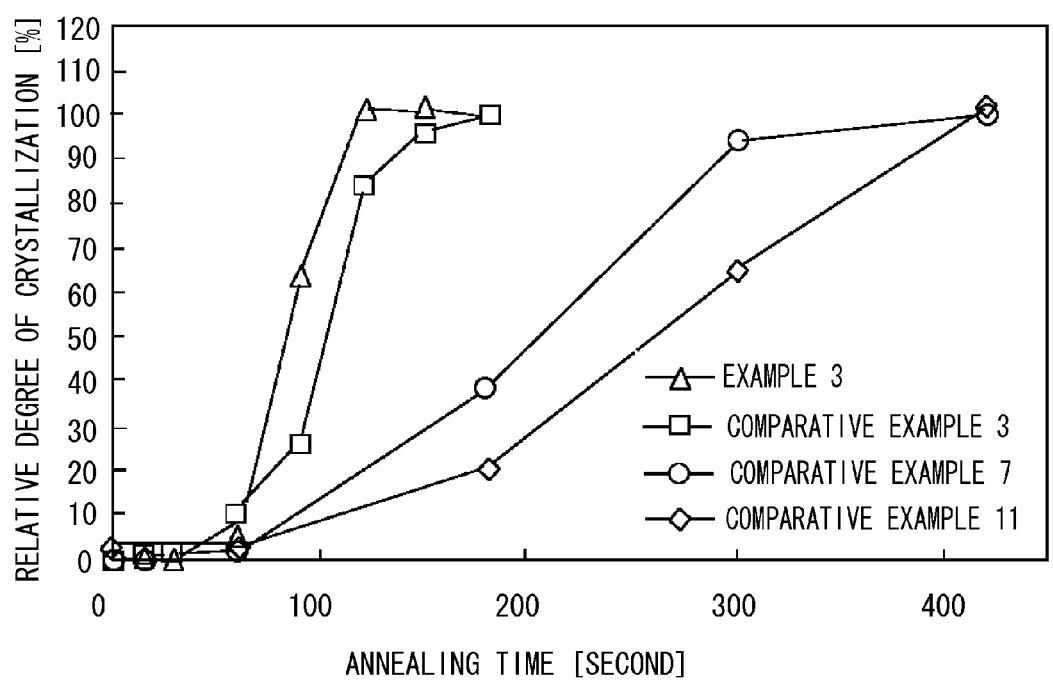
FIG. 3 is a plot that illustrates a comparison of crystallization rates in Examples of the present invention and the Comparative Examples.

FIG. 3 shows relative degrees of crystallization of the amorphous sample produced in Example 2 (time 0 seconds) and the annealed samples produced in Example 3. This figure confirms that the degree of crystallization reaches saturation after 120 sec of annealing.

Comparative Example 1

A total of 100 parts by weight of polybutylene furan dicarboxylate resin was loaded in a Labo Plastomill Mixer (trade name, blade: roller type, product of Toyo Seiki Seisakusho KK). A resin composition was obtained by melting and kneading at a temperature of 180° and a rotation speed of 30 rpm while rotating the two screws in the opposite directions.

Comparative Example 2

The resin composition obtained in Comparative Example 1 was placed on an aluminum plate and heated for 15 min at 200° C. in a muffle furnace. A molten sample was taken from the muffle furnace and immediately rapidly cooled by being immersed for 3 minutes in water at a temperature of 25° C. to produce an amorphous sample.

Comparative Example 3

Several amorphous samples obtained in accordance with Comparative Example 2 were annealed at a temperature of 110° C. in a drier. The annealing time was 30, 45, 90, 120 or 150 seconds. The annealed samples were removed from the drier to obtain samples with different degrees of crystallization.

Comparative Example 4

FIG. 3 shows relative degrees of crystallization of the amorphous sample produced in Comparative Example 2 and the annealed sample produced in Comparative Example 3. An annealing time of 170 seconds, which is about 1.5 times that in Example 4, was required for the degree of crystallization to reach saturation.

Comparative Example 5

A total of 100 parts by weight of polylactic resin was loaded in a Labo Plastomill Mixer (trade name, blade: roller type, product of Toyo Seiki Seisakusho KK. A resin composition was obtained by melting and kneading at a temperature of 180° C. and a rotation speed of 30 rpm while rotating the two screws in the opposite directions.

Comparative Example 6

The resin composition obtained in Comparative Example 5 was placed on an aluminum plate and heated for 15 min at 200° C. in a muffle furnace. A molten sample was taken from the muffle furnace and immediately rapidly cooled by being immersed for 3 minutes in water at a temperature of 25° C. to produce an amorphous sample.

Comparative Example 7

Several amorphous samples obtained in accordance with Comparative Example 6 were annealed at a temperature of 110° C. in a drier. The annealing time was 60, 180, 300 or 420 seconds. The annealed samples were removed from the drier to obtain samples with different degrees of crystallization.

Comparative Example 8

FIG. 3 shows relative degrees of crystallization of the amorphous sample produced in Comparative Example 6 (time 0 seconds) and the annealed samples produced in Comparative Example 7. An annealing time of 400 seconds, which is about 3.3 times that in Example 4, was required for the degree of crystallization to reach saturation.

Comparative Example 9

A total of 99 parts by weight of a polylactic resin and 1 part by weight of hematoporphyrin dihydrochloride were loaded in a Labo Plastomill Mixer (trade name, blade: roller type, product of Toyo Seiki Seisakusho KK). A resin composition was obtained by melting and kneading at a temperature of 180° C. and a rotation speed of 30 rpm while rotating the two screws in the opposite directions.

Comparative Example 10

The resin composition obtained in Comparative Example 9 was placed on an aluminum plate and heated for 15 min at 200° C. in a muffle furnace. A molten sample was taken from the muffle furnace and immediately rapidly cooled by being immersed for 3 minutes in water at a temperature of 25° C. to produce an amorphous sample.

Comparative Example 11

Several amorphous samples obtained in accordance with Comparative Example 10 were annealed at a temperature of 110° C. in a drier. The annealing time was 60, 180, 300 or 420 seconds. The annealed samples were removed from the drier to obtain samples with different degrees of crystallization.

FIG. 2A and FIG. 2B show XRD (X-ray diffraction) spectra of different compositions in Comparative Example 11. Specifically, FIG. 2A shows the spectrum of polylactic acid, and FIG. 2B shows the spectrum of hematoporphyrin dihydrochloride. The spectrum of polylactic acid shown in FIG. 2A has a peak close to an X-ray diffraction angle of 17°, whereas the spectrum of hematoporphyrin dihydrochloride shown in FIG. 2B has no peak close to an X-ray diffraction angle of 17°. Further, the X-ray diffraction intensity of polylactic acid shown in FIG. 2A is significantly (by several hundreds) different from that of hematoporphyrin dihydrochloride shown in FIG. 2B, and the crystal structures of the two compounds are not similar.

Comparative Example 12

FIG. 3 shows relative degrees of crystallization of the amorphous sample produced in Comparative Example 10 (time 0 seconds) and the annealed samples produced in Comparative Example 11. An annealing time of 400 seconds, which is about 3.3 times that in Example 4, was required for the degree of crystallization to reach saturation.

The results obtained in comparing the annealing time necessary for the crystallization of resin compositions of Example 3, Comparative Example 3, Comparative Example 7, and Comparative Example 11 to reach saturation are shown in Table 1.

TABLE 1

|  | Example 3 | Comparative Example 3 | Comparative Example 7 | Comparative Example 11 |
|---|---|---|---|---|
| Annealing time required for crystallization to reach saturation | 120 sec | 170 sec | 400 sec | 400 sec |

The present invention is very useful in various industrial fields in which resin compositions are employed in the production of molded plastic products. In particular, the crystallization rate of resin compositions using plant-derived resins in accordance with the present invention as starting materials is greatly increased compared to that of the conventional plant-derived resins. This is especially useful for increasing industrial productivity while still using plant-derived plastics.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-204704, filed Aug. 6, 2007, which is hereby incorporated by reference herein in its entirety.

What is claimed is:

1. A resin composition comprising hematoporphyrin dihydrochloride and any one of a polyethylene furan dicarboxylate resin, a polypropylene furan dicarboxylate resin, and a polybutylene furan dicarboxylate resin.

2. The resin composition according to claim 1, comprising hematoporphyrin dihydrochloride and the polybutylene furan dicarboxylate resin.

3. A molded article comprising a resin composition according to claim 1, which has been molded.

* * * * *